(12) United States Patent
Wolf et al.

(10) Patent No.: US 12,529,415 B2
(45) Date of Patent: Jan. 20, 2026

(54) MECHATRONIC DRIVE MODULE

(71) Applicant: SMW-Autoblok Spannsysteme GmbH, Meckenbeuren (DE)

(72) Inventors: Emanuel Wolf, Markdorf (DE); Eckhard Maurer, Oberteuringen (DE)

(73) Assignee: SMW-Autoblok Spannsysteme GmbH (DE)

( * ) Notice: Subject to any disclaimer, the term of this patent is extended or adjusted under 35 U.S.C. 154(b) by 0 days.

(21) Appl. No.: 18/740,785

(22) Filed: Jun. 12, 2024

(65) Prior Publication Data
US 2024/0418249 A1 Dec. 19, 2024

(30) Foreign Application Priority Data

Jun. 14, 2023 (EP) ..................................... 23179337

(51) Int. Cl.
*F16H 37/12* (2006.01)

(52) U.S. Cl.
CPC .................................. *F16H 37/126* (2013.01)

(58) Field of Classification Search
CPC .... F16H 37/126; F16H 53/025; F16H 25/186; B23B 31/28; B23B 31/302; B23B 31/025; B23B 31/1173; B23B 2231/20; B23B 2231/42; B23Q 3/06
See application file for complete search history.

(56) References Cited

U.S. PATENT DOCUMENTS

| | | |
|---|---|---|
| 2011/0214520 A1 | 9/2011 | Roussey |
| 2018/0106301 A1 * | 4/2018 | Moubarak ............... F16D 21/06 |
| 2018/0135751 A1 | 5/2018 | Maki |

FOREIGN PATENT DOCUMENTS

| | | | |
|---|---|---|---|
| DE | 19631675 | 2/1998 | |
| DE | 102005053555 | 8/2007 | |
| DE | 102009021874 | 11/2010 | |
| DE | 112011105196 | 1/2014 | |
| DE | 102013200716 A1 * | 7/2014 | ............. F16D 28/00 |
| EP | 3246119 | 11/2017 | |

OTHER PUBLICATIONS

Translation DE-102013200716-A1 (Year: 2014).*

* cited by examiner

*Primary Examiner* — Terence Boes
(74) *Attorney, Agent, or Firm* — Pandiscio & Pandiscio

(57) ABSTRACT

In order to create a mechatronic drive module as a replacement for a hydraulically operated piston, it is proposed that a piston and an axial unit be provided, wherein the piston is mounted non-rotatably, but longitudinally displaceably, with respect to the axial unit, whereas the axial unit is arranged rotatably in a housing, but immovably in the longitudinal direction. The two elements mesh via a gate, in which guide pins are guided and which has a control cam, which are inclined in the direction of a longitudinal axis. A rotation of the axial unit, which can be generated by means of an electric motor, is converted to a piston stroke based on the form of the control cam in the gate and the rotationally fixed mounting of the piston.

15 Claims, 3 Drawing Sheets

MECHATRONIC DRIVE MODULE

REFERENCE TO PENDING PRIOR PATENT APPLICATION

This patent application claims benefit of European Patent Application No. 23179337.3, filed Jun. 14, 2023, which patent application is hereby incorporated herein by reference.

FIELD OF THE INVENTION

The present invention relates to a drive module, comprising a housing and a piston mounted non-rotatably, but longitudinally displaceably, with respect to the housing in the direction of a longitudinal axis for pressure or tension actuation in particular of a clamping means.

BACKGROUND OF THE INVENTION

The use of a wide range of clamping means on machine tools that require an actuating force for the actuation thereof has been known for a long time. This actuating force is routinely applied by means of hydraulic cylinders, which are used in the machine tools and whose pistons can be connected to the clamping means in order to facilitate an application with both a tensile force as well as with a compressive force.

Thus, for example, a power clamp, for instance a collet chuck or a clamping mandrel, is attached to a spindle head of a lathe in the region of the work area. Following behind it, i.e., facing away from the workpiece clamped in the power clamp, is the hydraulic cylinder which transmits the force via its pull rod to the power clamp.

However, the supply of hydraulic oil is routinely required for hydraulic applications, so that a hose line must be introduced. As a result, it is always necessary to work with multiple media, therefore usually with at least electrical energy and hydraulic pressure.

SUMMARY OF THE INVENTION

Against this background, the problem underlying the present invention is creating a drive module which overcomes said disadvantages of the prior art and constitutes an equivalent replacement for the known hydraulic pistons.

This problem is solved by a drive module according to the features of independent claim 1. Useful embodiments of this type of drive module can be taken from the following dependent claims.

Provided in this respect is a drive module, comprising a housing and a piston mounted non-rotatably, but longitudinally displaceably, with respect to the housing in the direction of a longitudinal axis for pressure or tension actuation in particular of a clamping means. According to the invention, this is characterized in that the piston is surrounded by an axial unit, which is mounted rotatably, but immovably in the direction of the longitudinal axis, wherein the axial unit is actuated electromotively in the direction of rotation and a gate is embodied between the piston and the axial unit, in which gate at least one guide pin is guided along a control cam inclined in the direction of the longitudinal axis to generate a piston stroke.

The invention therefore provides that a piston is present for the transmission of force that exerts an equivalent pressure on the clamping means, as in the case of a hydraulic piston, or insofar as other applications are desired where the invention can also be used casually. For this, the piston is mounted so that it cannot rotate with respect to the housing or with respect to the axial unit, but can only be moved out or pulled away in the direction of the longitudinal axis, that is, in the direction of an attached device such as a clamping means, but also any other applications. This takes place in that, for example, at least one guide pin is provided on the piston, which guide pin is guided in a gate, i.e., a guide groove, of the axial unit.

In can also be provided in the sense of a kinematic reversal that the at least one guide pin is fastened on the axial unit and engages in a gate or guide groove of the piston. Whenever the initially addressed solution is mentioned in the following, this should always also apply in the reversed configuration.

The axial unit can in turn rotate only around the longitudinal axis, but cannot be displaced in the direction or counter direction thereof. In the course of a rotation of the axial unit, the at least one guide pin consequently moves along the gate. If the gate were an annular groove, then the piston, which is fixedly connected to the guide pin, would not move. Due to a shaping of the gate with a control cam, which has an inclination with respect to the longitudinal axis, during the rotation of the axial unit, the guide pin is pressed in the direction of the control cam and the piston that is connected thereto is thereby displaced. This functions in both directions. The piston stroke corresponds thereby to that of the increase of the control cam along the distance traveled in the gate during the rotation of the axial unit.

Based on the purely electromotive drive of the axial unit, therefore, only a supply of electricity to the drive module is required for a transmission of force; further media are not necessary.

In a specific embodiment, the axial unit of such a drive module can comprise two cam disks, which together form the gate, wherein the cam disks are rotatably connected to each other with an interposition of at least one support sleeve. In particular, the cam disks can be simple round disks in the radial direction, which, in each case, form a wall of the gate passage in the longitudinal direction along their edges so that the guide pin is guided between the opposing walls and, in the course of a rotation of the axial unit, is pressed in the direction of the longitudinal axis.

Moreover, the gate can be divided into a plurality of identical gate sections. In such a case, the forces occurring are spread out more uniformly over the circumference of the piston and axial unit, so that a canting is prevented. Every gate section then runs the same as the adjacent gate sections, but offset by an angle.

The use of three guide pins is viewed as especially advantageous, so that the gate is divided into three identical gate sections and every point of the gate sections repeats after a 120° rotation. Therefore, the guide pins are also offset from each other by 120° in this case.

In order to set the axial unit as such into a rotational motion around the longitudinal axis, it can be provided that the axial unit interacts with a toothed ring surrounding said axial unit. The toothed ring can in particular closely surround the axial unit, so that a force acting on the toothed ring is transmitted to the axial unit. In a first, simple embodiment, this can take place directly if the toothed ring is connected to the axial unit without any play. Then any force initiated into the toothed ring is transmitted directly to the axial unit. The disadvantage of this, however, is that for example when using a drive module with a power clamp, the build-up of a clamping force without further advancing of the power clamp is not possible. As a result, it is preferred if the toothed ring is mounted movably on the axial unit, but spring-loaded around a center position. In the aforementioned case, the power clamp reaches a stop position, for instance, because a workpiece is gripped, therefore further force can be applied to the toothed ring, which is initiated into a spring system of the toothed ring with respect to the axial unit. In the case of the application of force to the workpiece, the power clamp is therefore re-tensioned from the spring force, without the toothed ring needing to be motor-driven again for this purpose. The system tightens itself as needed, so that the workpiece is always held securely.

In a specific embodiment of the mounting of the toothed ring, at least two support sleeves can be provided on the axial unit and a radial guide is formed between the support sleeves and the toothed ring, in which radial guide a guide spring is guided in a guide groove. In the case of a movement of the toothed ring with respect to the axial unit, the toothed ring is thereby guided captively. In doing so, it is also possible for the groove to be formed in the toothed ring as well as in the axial unit. However, since the axial unit already comprises two cam disks and is thereby constructed in a multilayered manner, it is preferred if the support sleeves form the guide groove and are part of the axial unit.

The guide groove can furthermore have a trough-shaped widening, wherein a driver is accommodated in the trough-shaped widening for the transmission of force. Insofar as the guide groove is again assigned to the axial unit, this means that the driver is fixedly connected to the toothed ring, if necessary, is formed as a single piece with it. The driver is situated in the widening of the groove and, for a further advantage, can be supported on both sides with respect to the frontal ends of the trough-shaped widening by means of compression springs. After reaching an abutment position of the power clamp connected to the piston for example, said compression springs absorb the further energy, in order to re-tension this with respect to the workpiece.

For a drive of the toothed ring, an electric motor can be assigned to the drive module in the housing, which motor interacts with the toothed ring either directly or indirectly with the interposition of a gearing mechanism. With particular advantage, a planetary gear can be assigned to the electric motor, thereby enabling the transmission of high torques. The transmission of the torque to the toothed ring can take place with the aid of a spur gear.

Furthermore, it can be provided that a microcontroller that is data-connected to force sensors for force control is assigned to the electric motor. In the case of a such a solution, the sensors record the force actually applied by the power clamp and correspondingly regulate the control of the electric motor.

To prevent an unwanted movement of the toothed ring after shutting down the electric motor, a holding brake, preferably a currentlessly blocking electric holding brake, can then be assigned to the toothed ring. Said holding brake can in particular also interact with the toothed ring via the aforementioned spur gear.

The invention described in the foregoing will be explained in greater detail in the following based on an embodiment.

DETAILED DESCRIPTION OF THE PREFERRED EMBODIMENTS

Figure 1:
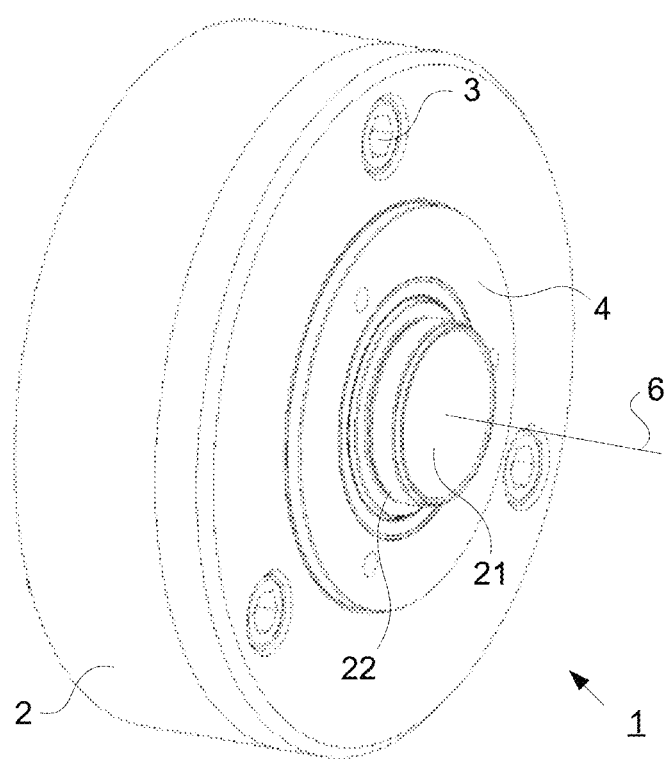
FIG. 1 A perspective representation of a mechatronic drive module shown diagonally from above, FIG. 2 A perspective partial section of the drive module according to FIG. 1, FIG. 3 A lateral partial section of a piston of the drive module according to FIG. 2 with an axial module and toothed ring, FIG. 4 A perspective partial section of the piston with cam disks of the axial module according to FIG. 3 with support sleeves and toothed ring, and FIG. 5 A perspective representation of the complete axial module with the toothed ring and piston shown diagonally from above.

FIG. 1 shows a drive module 1, which is provided as a purely electromechanical replacement for a hydraulic piston. For this purpose, the drive module 1 comprises a piston 21, which is accommodated in a centered manner in a housing 2 of the drive module 1 and can be displaced purely electromechanically along a longitudinal axis 6 out of the housing 2 and into the housing 2. In doing so, the drive module 1 is constructed functionally so that it also satisfies all requirements that are placed on a hydraulic piston. That way, the drive module can be connected via a screw connection 3 to the machine spindle in order to be held thereon. A centering ring 4 provides for a face contact vis-à-vis a clamping means to be attached and the clamping means itself can be connected to the piston 21 via a piston connector 22 so that it can be subjected to pressure and tension. It is only necessary to also provide the required electrical energy, which, however, can be procured via the machine spindle.

Figure 2:
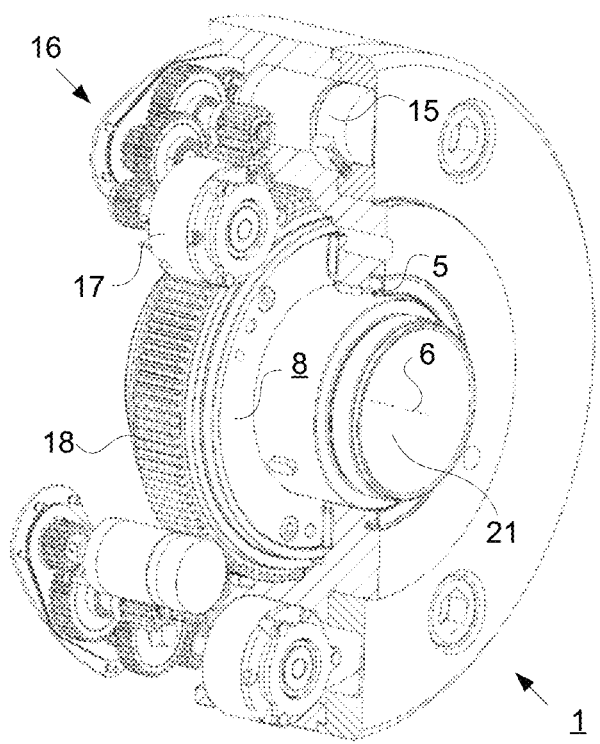

FIG. 2 shows the structure of the housing, wherein the present arrangement is constructed to be circularly symmetrical. The parts arranged around the piston 21 and around an axial unit 8 surrounding the piston 21 are used three times, which is scalable to a certain extent. Instead of three electric motors 15 with gearing mechanisms 16 and holding brakes 17, fewer or more could also be used, for one thing, in order to increase the force on the axial unit, moreover in order to guarantee a uniform coupling of the force and to prevent torsional forces from occurring.

The piston 21 is mounted in the interior of the housing 2 so that it is accommodated non-rotatably, but longitudinally displaceably in the housing. The present arrangement is specifically suitable for a piston stroke of up to 6 mm. In order to achieve this stroke, the electric motors 15 with an interposition of gearing mechanisms 16 act on a toothed ring 18, which surrounds an axial unit 8 that is radially movable, but fixed in the longitudinal direction. At the end of a rotation of the electric motor 15, it is possible with the aid of a holding brake 17 to prevent the toothed ring 18 from rotating back in the counter direction due to restoring forces. A dust-tight and dirt-proof mounting of the piston 21 is achieved by means of the seal 5.

Figure 3:
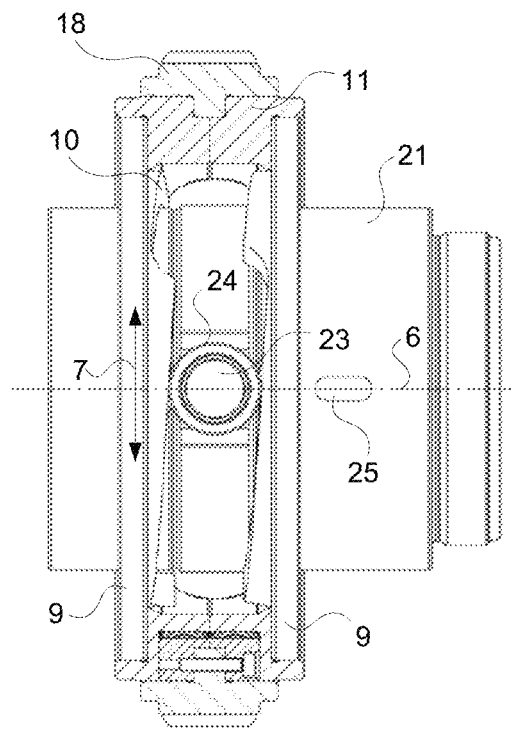

If the toothed ring 18 is rotated by means of ultimately the electric motors 15, said rotation is transmitted like this to the axial unit 8. FIG. 3 in this case shows that a piston stroke is generated due to a rotation of the axial unit 8. The essentially cylindrical piston 21 comprises on its surface area a plurality of guide pins 23, on which a sliding bearing 24 is attached in each case for better mounting. The cam disks 9 of the axial unit 8 are interconnected annular disks, which have projections facing each other on their interior edge, which form the corresponding control cams. Together the cam disks 9 thereby form a gate 10, which is inclined with respect to the longitudinal axis 6. This gate repeats for each guide pin 23 of the piston 21, therefore, in the case of an arrangement of three guide pins 23, three times at an offset of 120°. The use of an anti-rotation device 25, which makes sure that the piston is not able to co-rotate with respective to the housing 2, ensures that, because of a rotation of the axial unit 8, the guide pin 23 must move within the gate 10 in the direction of rotation 7 and thereby has a movement component in the longitudinal direction 6, which produces the piston stroke. The anti-rotation device is realized as a groove, which has a corresponding counterpart on the housing 2, wherein the groove and the counterpart are connected via a feather key in such a way that the piston remains mounted non-rotatably, but longitudinally displaceably.

Figure 4:
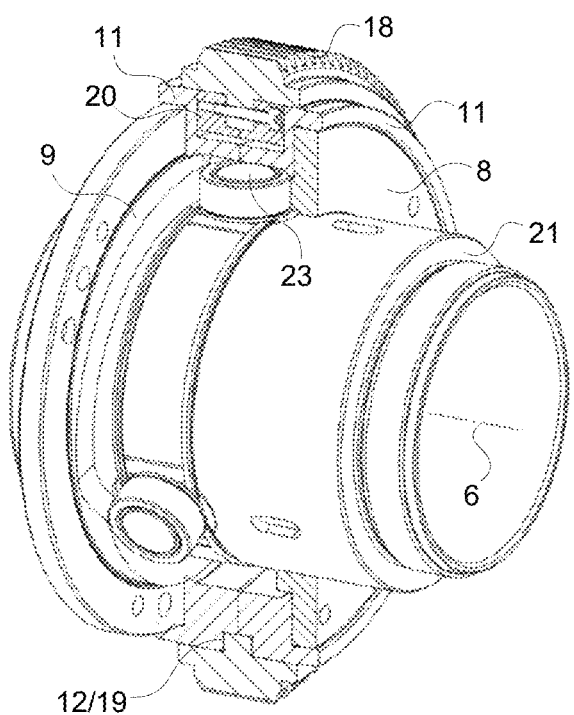

FIG. 4 further shows how the cam disks 9 of the axial unit 8 that are arranged around the piston 21 are assembled. This occurs by means of two support sleeves 11, which are screwed together with the cam disks 9. In the process, the support sleeves 11 keep a guide groove 12 free, in which a corresponding guide spring 19 of the toothed ring 18 is guided so it is radially displaceable. The toothed ring 18 is thereby movable with respect to the axial unit 8, but has drivers 20, which are provided [on] the toothed ring 18 on the inner side thereof again every 120°, surrounding the guide spring 19.

Figure 5:
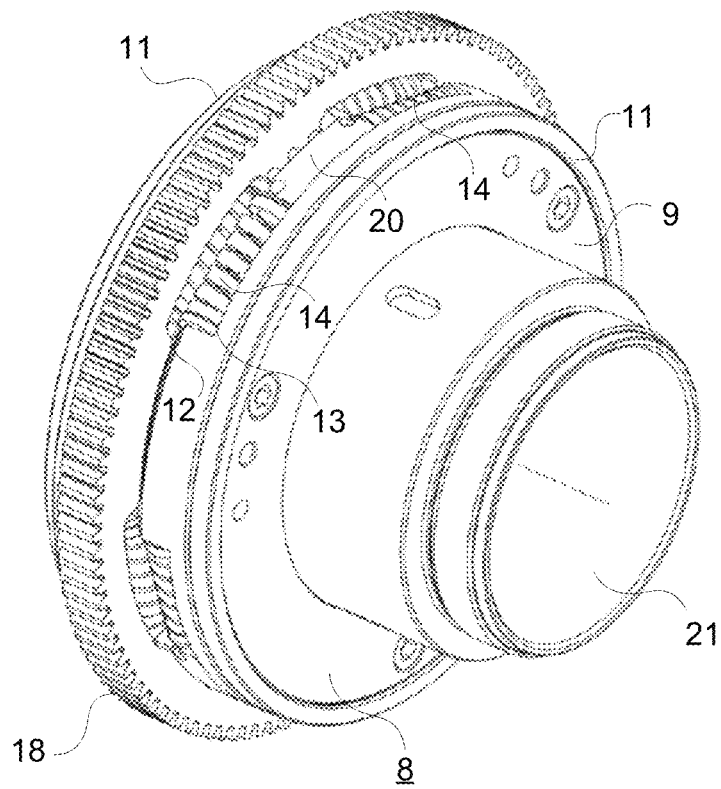

The drivers 20 with the toothed ring 18 fastened thereon are depicted again in FIG. 5 together with the complete axial unit 8 and the piston 21. The drivers 20 are thereby situated in widenings 13 of the guide groove 12, which are likewise provided every 120°. Arranged on both sides of the drivers 20 are compression springs 14, with whose help the drivers 20 are supported with respect to the frontal ends of the trough-shaped widenings 13, in order to build up an additional tension, in the case of a further rotation of the toothed ring 18 after reaching a contact of a clamping means possibly connected to the piston 21 and after the striking of the piston 21 that occurs in this respect. If, as a result of a mechanical processing of a workpiece, the access of the clamping means is released, then a re-tensioning takes place from the force stored in the compression springs 14 and an additional start-up of the electric motors 15 is not required for re-tensioning, whereas the workpiece is held securely.

Consequently, the foregoing describes a drive module which overcomes the known disadvantages of the prior art and constitutes an equivalent replacement for the known hydraulic pistons.

LIST OF REFERENCE NUMBERS

1 Drive module
2 Housing
3 Screw connection
4 Centering ring
5 Seal
6 Longitudinal axis
7 Direction of rotation
8 Axial unit
9 Cam disk
10 Gate
11 Support sleeve
12 Guide groove
13 Widening
14 Compression spring
15 Electric motor
16 Gearing mechanism
17 Holding brake
18 Toothed ring
19 Guide spring
20 Driver
21 Piston
22 Piston connector
23 Guide pin
24 Sliding bearing
25 Anti-rotation device

What is claimed is:

1. A drive module, comprising a housing (2) and a piston (21) mounted non-rotatably, but longitudinally displaceably, with respect to the housing (2) in the direction of a longitudinal axis (6) for pressure or tension actuation of a clamping means,
   characterized in that the piston (21) is surrounded by an axial unit (8), which is mounted rotatably, but immovably in the direction of the longitudinal axis (6), wherein the axial unit (8) is actuated electromotively in the direction of rotation (7) and a gate (10) is embodied between the piston (21) and the axial unit (8), in which gate at least one guide pin (23) is guided along a control cam inclined in the direction of the longitudinal axis (6) to generate a piston stroke;
   characterized in that the axial unit (8) comprises two cam disks (9), which together form the gate (10), wherein the cam disks (9) are rotatably connected to each other with an interposition of at least one support sleeve (11).

2. The drive module according to claim 1, characterized in that the gate (10) is divided into a plurality of identical gate sections and in each case a guide pin (23) is guided in each gate section.

3. The drive module according to claim 2, characterized in that three gate sections and three guide pins (23) are provided, in each case at a distance of 120°.

4. The drive module according to claim 1, characterized in that the axial unit (8) interacts with a toothed ring (18) surrounding said axial unit.

5. The drive module according to claim 4, characterized in that the toothed ring (18) is mounted movably on the axial unit (8), but spring-loaded around a center position.

6. The drive module according to claim 1, characterized in that at least two support sleeves (11) are provided and a radial guide is formed between the support sleeves (11) and the toothed ring (18), in which radial guide a guide spring (19) is guided in a guide groove (12).

7. The drive module according to claim 6, characterized in that the guide groove has at least one trough-shaped widening (13), wherein a driver (20) is accommodated in the trough-shaped widening (13) for the transmission of force.

8. The drive module according to claim 7, characterized in that the driver (20) is supported on both sides with respect to the frontal ends of the trough-shaped widening (13) by means of compression springs (14).

9. The drive module according to claim 1, characterized in that an electric motor (15) is assigned to the housing (2), which motor interacts with the toothed ring either directly or indirectly with the interposition of a gearing mechanism (16).

10. The drive module according to claim 9, characterized in that a planetary gear and/or a spur gear is/are assigned to the electric motor (15).

11. The drive module according to claim 9, characterized in that a microcontroller that is data-connected to force sensors for force control is assigned to the electric motor (15).

12. The drive module according to claim 1, characterized in that a holding brake (17) is assigned to the toothed ring (18).

13. The drive module according to claim 12, characterized in that the holding brake (17) comprises a currentlessly blocking electric holding brake.

14. A drive module, comprising a housing (2) and a piston (21) mounted non-rotatably, but longitudinally displaceably, with respect to the housing (2) in the direction of a longitudinal axis (6) for pressure or tension actuation of a clamping means,
- characterized in that the piston (21) is surrounded by an axial unit (8), which is mounted rotatably, but immovably in the direction of the longitudinal axis (6), wherein the axial unit (8) is actuated electromotively in the direction of rotation (7) and a gate (10) is embodied between the piston (21) and the axial unit (8), in which gate at least one guide pin (23) is guided along a control cam inclined in the direction of the longitudinal axis (6) to generate a piston stroke;
- characterized in that an electric motor (15) is assigned to the housing (2), which motor interacts with the toothed ring either directly or indirectly with the interposition of a gearing mechanism (16);
- characterized in that a microcontroller that is data-connected to force sensors for force control is assigned to the electric motor (15).

15. A drive module, comprising a housing (2) and a piston (21) mounted non-rotatably, but longitudinally displaceably, with respect to the housing (2) in the direction of a longitudinal axis (6) for pressure or tension actuation of a clamping means,
- characterized in that the piston (21) is surrounded by an axial unit (8), which is mounted rotatably, but immovably in the direction of the longitudinal axis (6), wherein the axial unit (8) is actuated electromotively in the direction of rotation (7) and a gate (10) is embodied between the piston (21) and the axial unit (8), in which gate at least one guide pin (23) is guided along a control cam inclined in the direction of the longitudinal axis (6) to generate a piston stroke;
- characterized in that a holding brake (17) is assigned to the toothed ring (18).

* * * * *